(12) United States Patent
French et al.

(10) Patent No.: US 6,988,193 B2
(45) Date of Patent: Jan. 17, 2006

(54) SYSTEM AND METHOD FOR CREATING A DEFINITION FOR A TARGET DEVICE BASED ON AN ARCHITECTURE CONFIGURATION OF THE TARGET DEVICE AT A BOOT SERVER

(75) Inventors: Steven M. French, Austin, TX (US); Javier A. Guajardo, Jr., Austin, TX (US); Chakkalamattam J. Paul, Austin, TX (US); Marc-Arthur Pierre-Louis, Round Rock, TX (US); Bradford A. Stern, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 09/895,925

(22) Filed: Jun. 28, 2001

(65) Prior Publication Data
US 2003/0005276 A1    Jan. 2, 2003

(51) Int. Cl.
   *G06F 9/24*    (2006.01)
(52) U.S. Cl. .............................................. 713/2; 713/1
(58) Field of Classification Search .................. 713/1, 713/2
   See application file for complete search history.

(56) References Cited

U.S. PATENT DOCUMENTS

| | | | |
|---|---|---|---|
| 5,577,210 A | 11/1996 | Abdous et al. | |
| 5,675,800 A | 10/1997 | Fisher, Jr. et al. | |
| 5,822,521 A | 10/1998 | Gartner et al. | |
| 5,842,011 A | 11/1998 | Basu | |
| 5,870,554 A | 2/1999 | Grossman et al. | |
| 5,948,101 A * | 9/1999 | David et al. | 713/2 |
| 5,974,547 A | 10/1999 | Klimenko | |
| 6,061,788 A | 5/2000 | Reynaud et al. | |
| 6,108,779 A * | 8/2000 | Dean et al. | 713/2 |
| 6,138,234 A | 10/2000 | Lee et al. | |
| 6,178,503 B1 | 1/2001 | Madden et al. | |

(Continued)

FOREIGN PATENT DOCUMENTS

| | | |
|---|---|---|
| JP | 406332716 A | 12/1994 |
| JP | 410240663 A | 9/1998 |
| TW | 311313 | 2/1997 |
| TW | 410297 | 3/1999 |

OTHER PUBLICATIONS

A technical disclosure from IBM Technical Disclosure Bulletin v38 n1 Jan. 1995 p377-378 entitled "User Selectable Boot Process" by J. Landry, D. Norris and S. Pancoast, Jan. 1995.

(Continued)

*Primary Examiner*—Thomas Lee
*Assistant Examiner*—Mark Connolly
(74) *Attorney, Agent, or Firm*—Cardinal Law Group; Jeffrey S. LaBaw

(57) ABSTRACT

A method of booting a plurality of target devices in communication with a network based on at least one target device definition is provided. A server in communication with the plurality of target devices receives a request for a boot file from at least one target device. A boot server in communication with the plurality of target devices is contacted. The boot server determines if the target device is defined. If the target device is not defined, the target device definition for the target device is created at the boot server. A bootstrap is executed at the target device, the bootstrap corresponding to the target definition. Systems and programs for using the method are also provided.

33 Claims, 5 Drawing Sheets

U.S. PATENT DOCUMENTS

| | | |
|---|---|---|
| 6,189,100 B1 | 2/2001 | Barr et al. |
| 6,209,089 B1 | 3/2001 | Selitrennikoff et al. |
| 6,421,777 B1 * | 7/2002 | Pierre-Louis et al. .......... 713/2 |
| 6,718,462 B1 * | 4/2004 | Griffiths et al. ................ 713/2 |
| 2003/0014621 A1 * | 1/2003 | French et al. .................. 713/2 |

OTHER PUBLICATIONS

An abstract of AUS919990260 entitled "Remotely Controlled Boot Manager" by K. Hubacher, P. Theiller and D. Sposato, dated Dec. 14, 1999, pp. 1-10.

* cited by examiner

SYSTEM AND METHOD FOR CREATING A DEFINITION FOR A TARGET DEVICE BASED ON AN ARCHITECTURE CONFIGURATION OF THE TARGET DEVICE AT A BOOT SERVER

BACKGROUND OF THE INVENTION

1. Field of the Invention

The present invention relates to the remote booting of target client computing devices ("clients") where the software that makes the clients fully operational for an end-user is obtained through a computer communications network ("a network"). This software is obtained during the boot process through the client's network interface from server computing devices ("boot servers") that are repositories of that software. In particular, the present invention relates to the situation where clients that are composed of different sets of hardware components are introduced onto the network. Each unique set of client hardware components may require a unique set of software (i.e. a unique "client software definition") to be transferred from the boot server to the client in order to boot the client successfully. The present invention provides a means for automatically constructing such a client software definition when clients are introduced onto the network.

2. Description of the Related Art

A boot process on a client (or any computing device) is defined as a sequence of program instructions that begins automatically when the client is powered-on or reset and completes when an end-user software environment is operational on the client. The initial instructions that are executed in a boot process are fixed in the nonvolatile read-only memory ("ROM") of the hardware of the client so that they are always available to the client, even if it was previously shut off. As the boot process progresses, program instructions are located on a source outside of the client's ROM and copied, or loaded, into the client's volatile memory, also referred to as dynamic or random access memory ("RAM"). These instructions in RAM, referred to as software, are lost whenever the client is shut off or reset and therefore must be restored from an outside source during the boot process.

Once this software has been loaded into RAM, client execution is transferred from ROM memory to this software in RAM. This software continues the boot process by iteratively locating and loading additional software into the client's RAM as required until the end-user software environment is complete and operational. Typically, this end-user software environment contains an operating system ("OS") that does the general operation of the hardware of the client. This end-user software environment may also contain additional system programs to operate specialty hardware on the client and application programs that perform the end-user operations on the client as defined by the enterprise that owns the client.

Some clients are configured with ROM that contains instructions that direct the boot process to obtain software through the client's network interface. This is distinguished from the instructions contained in the ROM of "stand-alone" clients that direct the boot process to obtain the software to establish the end-user software environment only from nonvolatile media repositories contained in devices that are directly attached to the client, such as diskettes, hard disks, and CD-ROMs. A remote boot process allows end-user software environments to be created, located and maintained in a repository on a centrally located boot server. This represents a significant savings of administrative effort when compared with having to perform the same activities at each separate client location.

The instructions that direct the boot process to the network interface may be included in the client's Basic Input-Output System ("BIOS") ROM that contains the initial instructions to be executed after the client is started or reset. The instructions that direct the boot process in the network interface may also be contained in a separate, or "option" ROM attached to the network interface. The client's BIOS ROM can be configured to transfer client execution to the option ROM after the initial boot instructions in the BIOS ROM have completed. This network interface and its option ROM may be integrated into the client's main system board ("motherboard") or placed on a separate hardware communications adapter that is connected to the client's motherboard. Another alternative remote boot configuration is to have the BIOS ROM load and transfer execution to software in RAM that emulates the instructions of a remote boot option ROM. Such remote boot emulation software can be obtained from media of a local device, such as a diskette, and permits clients to be remote booted even when their network interface hardware cannot contain an option ROM for that purpose.

Once the remote boot instructions in the BIOS ROM, option ROM, or remote boot emulation software begin to execute, they must initialize the network interface hardware so that it can send and receive signals on the network to which it is attached. This is accomplished through a series of well-known directives to that hardware. Then, the remote boot instructions must initiate and support network protocols that permit the client to announce itself to potential boot servers on the network as a client that requires a remote boot. These network protocols must also permit the client and a boot server to determine each other's network addresses so that they can direct network communications to each other. Finally, these network protocols must assure the accurate delivery of software and other information through the network between the boot server and the client.

Two sets of network protocols have become widely used for remote booting of clients on networks today. One set is called Remote Program Load or Remote Initial Program Load ("RPL" or "RIPL"). This older set of network protocols is associated with Local Area Networks ("LANs") and is primarily used when the boot servers and the remote boot clients are attached to the same LAN. Generally, this requires that the boot servers and the remote boot clients be physically located close to each other.

A RPL client initiates the network boot process by transmitting a special broadcast frame on the LAN that indicates the unique media access control ("MAC") identifier of the client's network interface hardware as its source and indicates that the client requires a RPL boot. As a broadcast, this special frame contains a unique, well-known destination MAC identifier that indicates that any other computing device ("host") attached to the LAN can receive the frame. This includes any hosts that are boot servers. This broadcast frame with its well-known destination MAC identifier frees the remote boot client from the "chicken and egg" problem of having to initially know the destination MAC identifier of a particular boot server to get the remote boot process started.

A boot server responds to the receipt of this broadcast frame by looking up the remote boot client's MAC identifier as a key to a record that describes the required software for the client. This record is contained in a file that lists the records of all potential remote boot clients that the boot server may service. This record indicates the name of a file on a loading device (for instance a hard disk) attached to the boot server that contains an initial network bootstrap program (an "initial NBP") that is to operate on the client. The RPL map file record also contains other configuration data about the client to aid in remote booting the client. The file containing the initial NBP is loaded from the loading device and transmitted on the LAN to the client as a frame or series of frames that indicate the client's MAC address as the destination. The RPL process re-directs the loaded initial NBP file to the boot server's network interface for transmission to the client instead of writing it to the boot server's own RAM.

Once it is transferred to the client, this initial NBP becomes the first software loaded into the client's RAM. RPL also provides a means for running this initial NBP on the client. This initial NBP initializes and restarts the client's network interface. It also retains the MAC identifier of the boot server as a destination for possible later requests. The initial NBP may be a complete end-user software environment, or a program that requests other files from the boot server in order to assemble an end-user software environment on the client.

The other, newer set of network protocols are built upon the underlying Internet Protocol (IP) that forms the basis for the Internet and other Telecommunications Control Protocol/Internet Protocol ("TCP/IP") wide area networks ("WANs"). As the name "wide area network" implies, this set of protocols permits boot servers and remote boot clients to be physically located far from each other.

An early protocol used for remote boot in IP networks is the "Bootstrap Protocol" ("BOOTP"). BOOTP generally requires that the boot server and the remote boot clients be located on the same IP address sub-network, and as such gives little additional capability over RPL. BOOTP also requires that each remote boot client be pre-listed in a table on the boot server and assigned a fixed IP address in order to permit it to be booted. The client initiates the BOOTP protocol by broadcasting a BOOTP Request packet that indicates the MAC identifier of the client as the source and indicates an IP broadcast address as the destination. Again, this solves the "chicken and egg" problem in a manner similar to RPL so that the client does not initially need to know the address of a boot server, except that the broadcast address used is an IP address, not a MAC identifier.

When a boot server receives the BOOTP Request packet, it looks for a record with the client's MAC identifier in its table of clients. If the boot server finds a record for that MAC identifier in the table, the boot server sends a BOOTP Response packet to the client that contains the IP address that is assigned to the client and the name of a file containing an initial NBP that is to be requested by the client. This information is maintained in the client's record on the boot server. The BOOTP Response packet also contains the IP address of the boot server.

When the client receives the BOOTP Response packet, the program instructions in the client's ROM saves the client's assigned IP address, the IP address of the boot server, and the name of the initial NBP file. The program instructions in the client's ROM then send a Trivial File Transport Protocol (TFTP) Request packet to the IP address of the boot server that requests the file containing the initial NBP. The boot server responds by sending TFTP Data packet(s) that contain the initial NBP. The initial NBP is written into the client's RAM. Once the initial NBP is received, the client's ROM transfers the client's execution to the initial NBP.

A newer set of IP protocols, collectively called the Preboot Execution Environment ("PXE") as described by Intel® Corporation in the *Preboot Execution Environment (PXE) Specification Version* 2.1, has been developed to provide more flexibility than is available with BOOTP. PXE uses a follow-on protocol to BOOTP called the Dynamic Host Configuration Protocol ("DHCP") that permits much more flexibility and capability in configuring clients (hosts) on the network. This includes the dynamic assignment of IP addresses to clients that may or may not have been pre-listed on the boot server or any other server. PXE also defines other protocols based on extensions permitted in the format of DHCP network messages that can be used to identify the architecture of a remote boot client, to indicate to boot servers that the client is PXE enabled, and to direct the client to the address of a boot server that could be located anywhere in the world. PXE permits each of the following services used to remote boot a client to exist on a separate server machine, permitting greater server configuration flexibility to support client remote boot as well as other client and user support activities simultaneously:

The DHCP service that assigns an IP address to a client.

The Proxy DHCP service that directs the client to a BINL or Boot service.

The Binary Image Negotiation Layer (BINL) or Boot service that directs the client to a boot server operating a TFTP service, and that provides the name of the initial NBP file to request.

The TFTP service that delivers the initial NBP file to the client.

PXE also defines a set of remote boot support criteria that must be present in the BIOS ROM, option ROM, or option ROM emulation software of the client, including an application program interface ("API") that permits the initial software loaded into the client's RAM to make requests for additional software and data to permit the remote boot process to complete.

The RPL, BOOTP, or PXE remote boot process described above may do more than load software into the client's RAM, depending on the end-user software environment that is defined for the client. More software may be required than can be placed simultaneously in the client's RAM so that some of it has to be stored on nonvolatile local media (such as a hard disk) so that it can be retrieved when it is needed. It may be desirable for the client to store some, or all, of the end-user software environment to nonvolatile local media (such as a hard disk) so that the client will later have the ability to be booted locally. In such cases, some, or all, of the user software environment is "remote installed" on the client in addition to being remote booted on the client.

An important feature of the RPL, BOOTP, or PXE remote boot process is that the specifications of these processes do not place limits on the function of the initial NBP or any of the other software that is remote booted or remote installed to the target client. This permits that software to perform functions in addition to remote boot or remote install of a previously defined client software environment. One possibility is that such software may be used to discover and scan information about the hardware configuration of the client and report it back to the boot server. The boot server could then use this information to create or update the client software definition so that it matches the hardware configuration of the client before it is transferred to the client.

Present implementations of the remote boot or remote install processes described above require that the client software environment(s) be completely defined prior to the initiation of the remote boot of each client. A number of variations of this are available:

- A single default client software environment may be defined for all remote boot clients. This may work if all clients have the same hardware configuration, but may not work as well when there are a variety of such clients connected to the network.
- A limited set of alternate default client software environments may be defined. A selection menu is provided to the end-user of the client so that one of the default client software environments may be selected. This provides a limited selection of client software environments that may not reflect entire variety of clients connected to the network. Also, this method requires user intervention to complete the client remote boot process, and the user may not select the appropriate software environment for the client.
- The system administrator may define a specific software environment for each client. The administrator must assume or require perfect knowledge of each target client's hardware configuration. This may be quite difficult, particularly for networks that implement PXE where the clients may be widely scattered. Also, this set of specific software environments is difficult to maintain if the set of remote boot clients changes frequently and/or the hardware configurations of individual clients can change frequently.

These present implementations of the remote boot or remote install processes also make it difficult to implement system-wide policies governing the software environments of clients. For instance, such a policy might be to install Microsoft® Windows NT™ on all machines of a first type (e.g., all IBM® PC 300PL systems with more than 64 MB RAM), Microsoft Windows 2000™ on all machines of a second type (e.g., all desktops with more than 128 MB RAM), and Microsoft Windows™ 98 on all machines of a third type (e.g., all laptops). Additionally, it may be difficult to install a large number of machines efficiently without user or administrator intervention. For example, in the above scenario, a system administrator might be reduced to manually defining each target device by MAC address to the management system in order to achieve the described system-wide policy.

It would be desirable therefore to provide a method of remote booting a target client in a network environment that permits the client software environment of each individual client to be created, selected, or updated at client remote boot time based on client discovery and hardware inventory scan that is performed on the client as part of that remote boot process. The results of the client and hardware inventory scan could be reported back to the server, where those results are used as input to the client software environment definition process. This would result in the appropriate client software environment for the client as defined by the client's hardware and/or any system policies governing that hardware. This appropriate client software environment would then be transferred to the client during the remainder of the client remote boot process.

SUMMARY OF THE INVENTION

One aspect of the present invention provides a method of booting a plurality of target devices in communication with a network based on at least one target device definition. A request for a boot file from at least one target device is received. A boot server in communication with the plurality of target devices is contacted. The boot server may determine if the target device is defined. If the target device is not defined, the target device definition for the target device is created at the boot server. A bootstrap is executed at the target device, the bootstrap corresponding to the target device definition.

The target device may be scanned for at least one hardware configuration. The target device may be scanned for at least one software configuration. An architecture of the target device may be determined. At least one network policy for the target device may be determined. The target device definition may be created based on one or a combination of: the hardware configuration, the software configuration, the architecture and the network policy.

At least one request for a configuration file may be received from the target device. The configuration file may be transferred to the target device. The target device definition may be stored.

Another aspect of the present invention provides a method of booting a target device in communication with a network based on at least one target device definition. A boot server in communication with the network may determine if the target device has an associated target-device specific configuration file. If the device does not have the associated target-device specific configuration file, an architecture-based configuration file is transferred to the target device. A boot report is received from the target device. At least one network policy-based configuration file is transferred to the target device. The target device definition is created based on the architecture-based configuration file, the boot report and the network policy-based configuration file.

The boot report may be based on a hardware scan or software scan of the target device.

Receipt of the boot report may be acknowledged at the boot server. At least one request for an additional architecture-based configuration file may be received from the target device. The additional architecture-based configuration file may be transferred to the target device.

The target device definition may be stored. The target device may be rebooted based on the target device definition.

Another aspect of the present invention provides computer program product in a computer usable medium for booting a plurality of target devices in communication with a network based on at least one target device definition. The program comprises means for determining, at a boot server in communication with the network, if the target device has an associated target device specific configuration file. If the device does not have the associated target-device specific configuration file, the program comprises means for transferring an architecture-based configuration file to the target device, means for receiving, at the boot server, a boot report from the target device, means for transferring at least one network policy-based configuration file to the target device; and means for creating the target device definition based on the architecture-based configuration file, the boot report and the network policy-based configuration file.

The program may also comprise means for creating the boot report based on a hardware scan or a software scan of the target device. The program may also comprise means for acknowledging receipt of the boot report at the boot server. The program may also comprise means for receiving at least one request for an additional architecture-based configuration file from the target device. The program may also comprise means for transferring the additional architecture-based configuration file to the target device. The program may also comprise means for storing the target device definition. The program may also comprise means for re-booting the target device based on the target device definition.

Another aspect of the present invention provides a system for booting a plurality of target devices in communication with a network based on at least one target device definition. The system comprises means for determining, at a boot server in communication with the network, if the target device has an associated target-device specific configuration file. If the device does not have the associated target-device specific configuration file, the system comprises means for transferring an architecture-based configuration file to the target device, means for receiving, at the boot server, a boot report from the target device, means for transferring at least one network policy-based configuration file to the target device; and means for creating the target device definition based on the architecture-based configuration file, the boot report and the network policy-based configuration file.

The system may also comprise means for creating the boot report based on a hardware scan or a software scan of the target device. The system may also comprise means for acknowledging receipt of the boot report at the boot server. The system may also comprise means for receiving at least one request for an additional architecture-based configuration file from the target device. The system may also comprise means for transferring the additional architecture-based configuration file to the target device. The system may also comprise means for storing the target device definition. The system may also comprise means for re-booting the target device based on the target device definition.

Another aspect of the present invention provides a boot server for booting a plurality of target devices in communication with a network based on at least one target device definition. The boot server comprises means for determining if a target device has an associated target-device specific configuration file, means for transferring an architecture-based configuration file to the target device, means for receiving a boot report from the target device, means for transferring at least one network policy-based configuration file to the target device, and means for creating the target device definition based on the architecture-based configuration file, the boot report and the network policy-based configuration file.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

DETAILED DESCRIPTION OF THE PRESENTLY PREFERRED EMBODIMENTS

Figure 1:
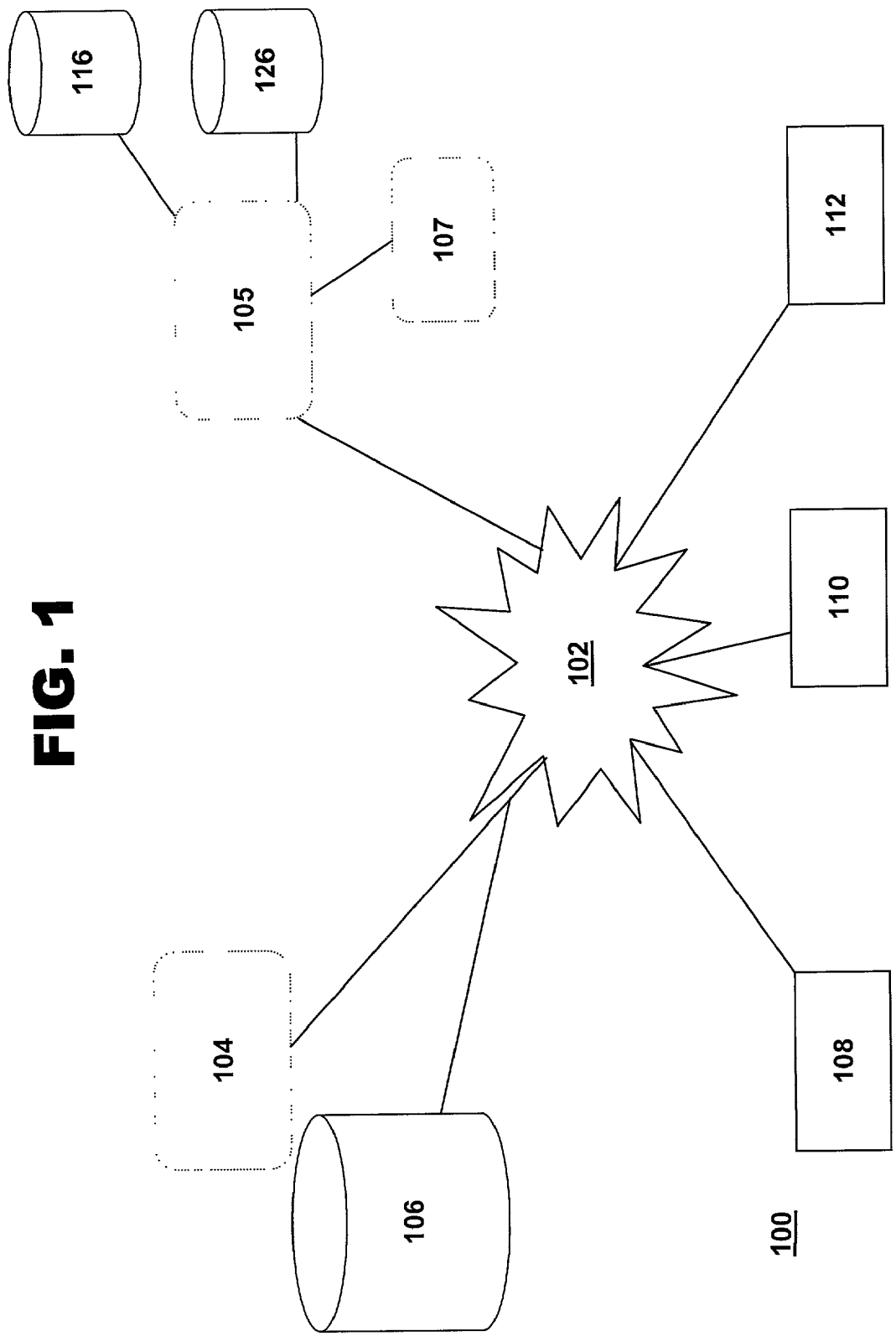
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices, such as computers, connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105 which may be identical to or different from server 104. Server 105 may also provide data, such as boot files, operating system images and applications to network 102 and/or to other components in communication with network 102 as described below. System 100 may also include additional servers (not shown). In one embodiment of the invention, one or more of servers 104, 105 may be a DHCP/PXE Proxy Server.

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or processed by network 102 and/or to other components in communication with network 102 as described below.

In one embodiment of the invention, storage unit 106 may be, may include or may be in communication with an inventory database 116. Alternatively, as seen in FIG. 1, inventory database 116 may be in communication with one or more of servers 104, 106, 107. This inventory database may comprise listings and related parameters of target devices in communication with network 102. For example, inventory database 116 may include a list of target devices 108, 110, 112 and configuration files associated with each target device or hardware and software information related to each target device. In one embodiment of the invention, the inventory database 116 may include hardware related information. For example, inventory database 116 may include a device identifier for each target device and a corresponding serial number and/or model number for the target device.

Storage unit 106 may be, may include or may be in communication with a policy database 126. Alternatively, as seen in FIG. 1, policy database 126 may be in communication with one or more of servers 104, 106, 107. This policy database may comprise information describing policies to be implemented in network 102. For example, policy database 126 may include a list of types of target devices and configuration requirements or options for each type of target device. Policy database 126 may also include, for example, a list of types of target devices and their default configurations depending on location in the network.

In addition, target devices 108, 110 and 112 are also in communication with network 102. These target devices may be, for example, personal computers or network computers.

Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

The present invention may also provide a network environment, which may include a DHCP/PXE proxy server. For example, server 104 may be a DHCP/PXE proxy server. Alternatively, server 105 may be a DHCP/PXE proxy server. System 100 may also include one or more boot servers 107. For example server 104 or server 105 may serve as a boot server 107. These boot servers may be co-located on servers 104, 105 with the DHCP/PXE proxy servers. In one embodiment of the invention, one or more target devices, such as devices 108, 110, 112, may include pre-boot extensions that allow the devices to download OS information from a boot server 107.

The present invention may also provide a network environment which may include one or more loading devices equipped with a remote loading feature and/or programs, such as, for example, a RPL function. For example, servers 104, 105 may serve as a loading device. Alternatively, one or more of target devices 108, 110, 112 may be equipped with a remote loading feature and/or programs and may serve as loading devices to other target devices. For example, a target device 108, 110, 112 equipped with a bootstrap program and a loader program may send the bootstrap program to one or more other target devices that broadcast a load request.

As described above, one embodiment of the present invention provides a network environment, which may include a boot server. For example, boot reservation server may be server 104, 105 or may be located on server 104, 105. Alternatively, as seen in FIG. 1, boot server may be a separate server as indicated at 107.

Boot server 107 may be any server capable of evaluating and/or managing network boot resources and/or parameters. For example, boot server 107 may be able to examine configuration files of target devices attached to the network and determine the OS of each target device. Boot server 107 may also be able to examine one or more inventory databases 116 of hardware scan information or other such configuration information corresponding to one or more target devices. Boot server 107 may also be able to examine other components of the network, such as loading devices or servers and evaluate the number of target devices requiring a specific OS that may be remotely booted from one or more loading devices or server. Boot server 107 may also be able to determine the total duration required for a boot to complete on one or more target devices. Boot server 107 may also be able to determine other suitable information about a given target device such as, for example, parameters or descriptions provided by the system administrator, to make such determinations. Boot server 107 may also be able to examine one or more policy databases 126 to determine which network policy may be applied to a given target device. Boot server 107 may be capable of dynamically determining or learning network boot resources and/or parameters. Boot server 107 may be capable of evaluating these parameters on a target device, a loading device or any other component of the network. For example, boot server 107 may be capable of detecting a given target device's hardware configuration and comparing the configuration to one or more databases of existing configurations to determine a target device-specific boot definition.

Boot server 107 may also be capable of automatically detecting a given target device and determining its configuration. Boot reservation server 107 may also be capable of automatically booting a given target device based on its determined configuration.

Boot server 107 may accomplish this automatic booting and may determine a target device's configuration using any suitable means or combination of means known in the art. For example, boot server 107 may be equipped with or in communication with a PXE boot service. Such a PXE boot service, may be, for example, the boot service described in Intel (TM) PXE specification version 2.1. Alternatively any suitable PXE boot service may be used. In one embodiment of the invention, the PXE boot service may point to TFTP Service on the boot server 107. The PXE boot service may also indicate the name of the initial Network Bootstrap Program (NBP) that a give target device is to request according to the indicated architecture type of the target device.

Boot server 107 may be equipped with or in communication with a TFTP Service, as is well known in the art. Alternatively, or in addition to a TFTP service, boot server 107 may also be equipped with a UDP (Universal Datagram Protocol) service as is well known in the art. In one embodiment of the invention, the PXE support provided by the PXE ROM code on the target device does not provide a means by which the target device can write its hardware and software scan results to the boot server using TFTP. The target device may then use UDP to do such "writes" to the boot server 107. The UDP service may then receive the scan results and direct them to one or more software processes (one or more daemons) on the boot server 107. The daemon may be used to process these scan results. Boot server 107 may also be equipped with any other communications services needed to support communications with target devices during or after the boot process.

Boot server 107 may also comprise or be able to access initial NBPs and/or other files corresponding to target device architectures that may be supported by network 102. For example, at least one NBP may be included for each type of target device supported by network 102. Each NBP may then be used for configuring any target device of a given type. Alternatively, these NPBs may be stored in any suitable storage location in communication with boot server 107. For example, these NPBs may be stored in inventory database 116. In some embodiments of the invention, the files corresponding to target device architectures may include all files needed to boot one or more undefined target devices. These files may also include files that can execute a scan of an undefined target device's installed hardware and software. In some embodiments of the invention, the files that are unique to each architecture type are organized into directories that are uniquely named so that target devices may use architecture-specific file path names to request them. An architecture-unique configuration file may also be included. The names of each architecture-unique configuration file may be known by each corresponding initial NBP. The configuration file may list other files needed to boot and scan a given target device.

Boot server 107 may also comprise or be able to access all files needed to complete the booting of already-defined target devices that may already be supported by network 102. For example, at least one NBP may be included for each target device that has already been defined in accordance with the present invention. Each NBP and any corresponding configuration files may then be used for configuring an already defined target device. Alternatively, these files may be stored in any suitable storage location in communication with boot server 107. For example, these NPBs may be stored in inventory database 116. In one embodiment of the invention, no matter where the files are stored, files that are unique to each target client are organized into directories named with a unique identifier identifying a given target device. Target device-specific or identifier specific file path names may then be used to request these files. In some embodiments of the invention, the target device-specific files may include target device-unique definition configuration file. This configuration file may include an identifier for the target device which is known by the target device's initial NBP. The configuration file may also list other files needed to boot the target device according to its definition.

Boot server 107 may also comprise or be in communication with one or more software processes (daemon) that monitor hardware and software scan data reported by one or more target devices. In some embodiments of the invention, this daemon may respond with specific instructions to a given target device. The daemon may also run processes to verify a given target device. In one embodiment of the invention, the daemon may create a boot definition from the scan data reported by the target device which may be used to define the target device.

As described above, boot server 107 may also comprise or be in communication with one or more storage units or databases, 106, 116, 126. In one embodiment of the invention, the database may be provided with tables that may be used by boot server 107 (or a daemon of boot server 107) to map the installed hardware and software on the target device as reported by hardware and/or software scans. For example, the installed hardware and software may be mapped to appropriate files needed to create a client-specific complete boot definition.

There may be more than a single instance of boot server 107 that is running a PXE Boot Service, and/or other services used to boot target devices. Moreover, it is contemplated that other network devices, such as gateways, routers, and servers, may redirect client boot service discover packets (and other protocol packets) originally directed to the IP address of the "primary" boot server 107 that has failed so that one or more "backup" boot servers may receive and process these packets. Thus, in some embodiments of the invention, the configuration of the local DHCP/PXE proxy servers may not be changed in the event that the "primary" boot server 107 fails. In some embodiments of the invention, the "primary" and "back-up" boot servers maintain or are able to access the definitions of one or more target devices. For example, definitions created on one boot server may be copied to the other boot servers.

Figure 2:
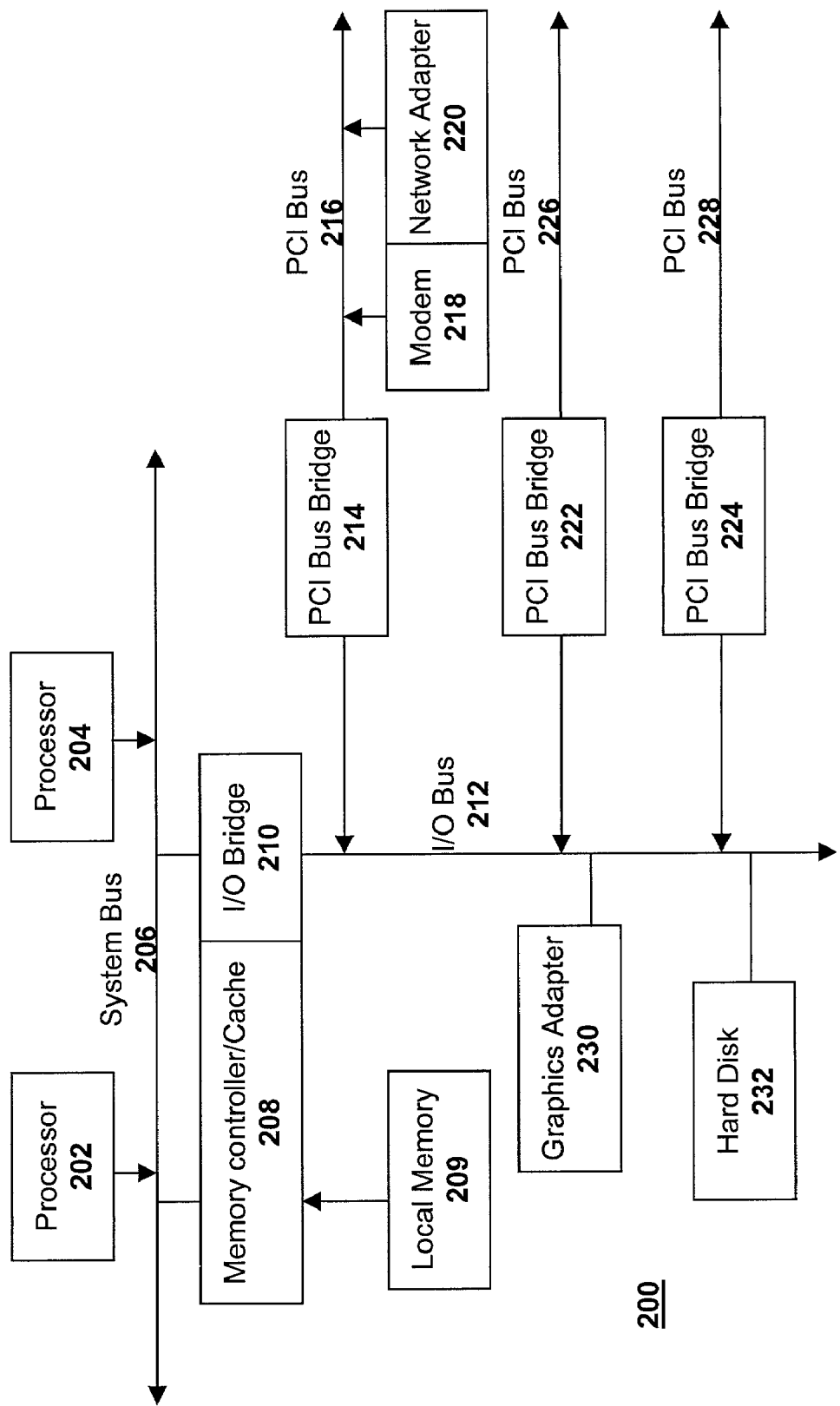
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104, 105 shown in FIG. 1.

Data processing system 200 may be a symmetric multi-processors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate components.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. For example, in one embodiment of the invention, PCI buses 226, 228 may support a network adapter with a remote loading feature, such as the RPL feature, installed. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

Figure 3:
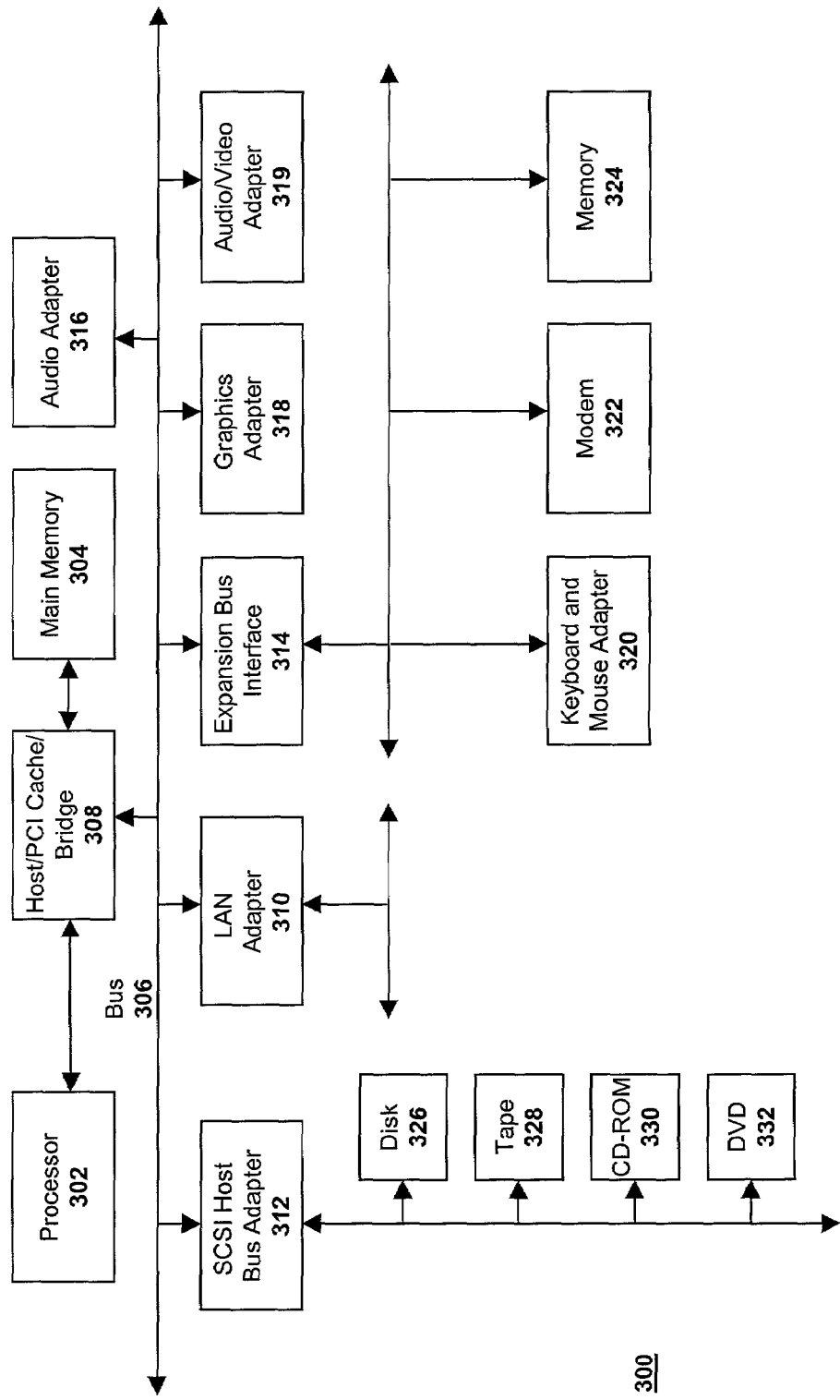
FIG. 3 is a block diagram of another embodiment of a data processing system in accordance with the present invention.

FIG. 3 is a block diagram of a data processing system in accordance with the present invention at 300. Data processing system 300 may be, for example, one or more of the target devices 108, 110, 112 depicted in FIG. 1 and described above. In one embodiment of the invention, data processing system 300 is a target device on which the disk drives are optional. Alternatively, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations support three or four PCI expansion slots or add-in connectors.

In one embodiment of the invention, an operating system (OS) may run on processor 302. This OS may be used to coordinate and provide control of various components within data processing system 300. The OS may be a commercially available operating system, such as, for example, Linux™, OS/2 Warp 4, or Windows 2000™. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

In one embodiment of the invention, system 300 may include a suitable configuration file which may indicate boot parameters that may be evaluated to determine network boot resources as described above.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide non-volatile memory for storing operating system files and/or user-generated data. Another embodiment of data processing system 300 may include network adapters suited to transmit or receive functions of a remote loading program and/or feature such as the RPL feature.

Figure 4:
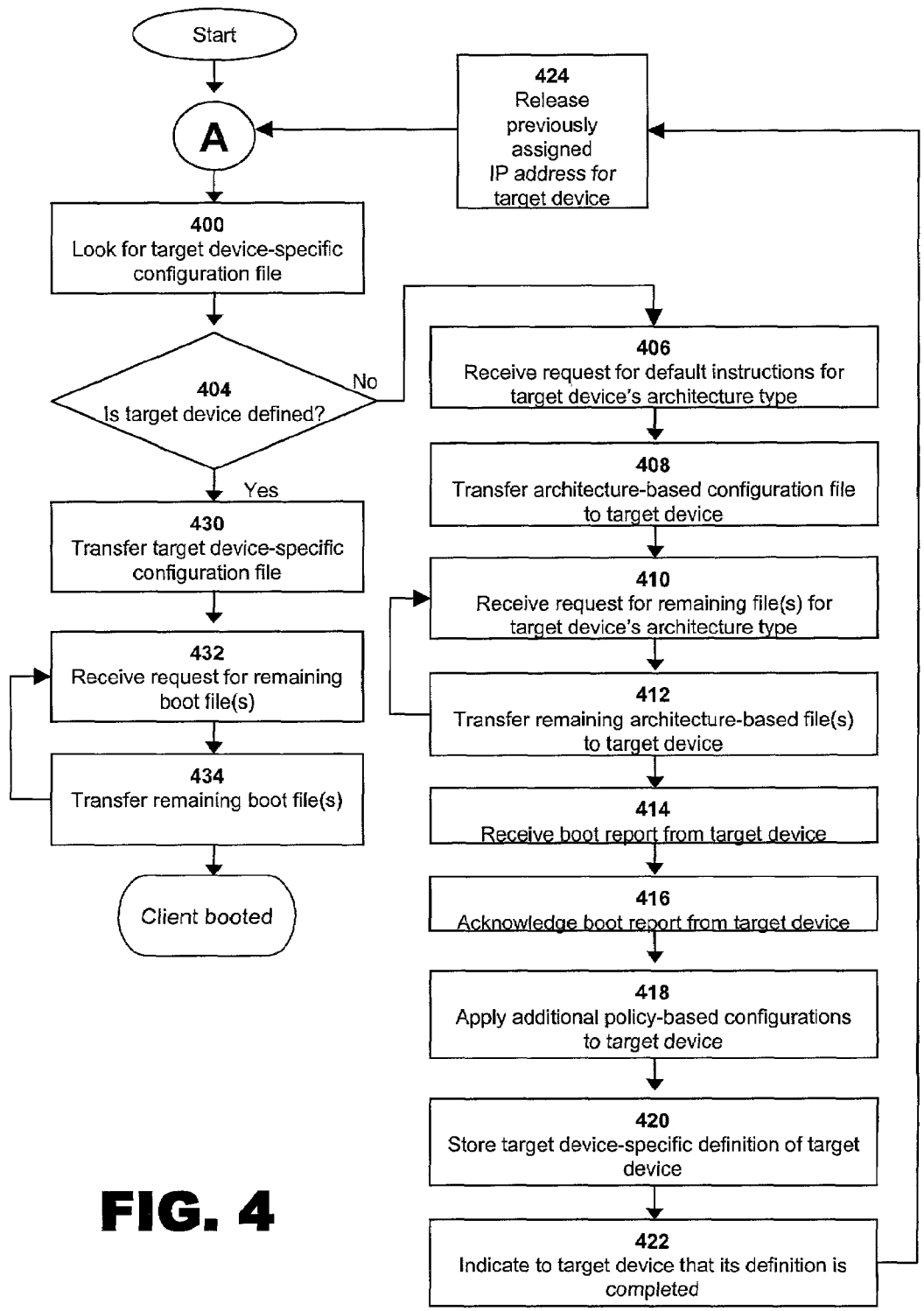
FIG. 4 is a flow diagram of one embodiment of a method of booting a target device in a network environment in accordance with the present invention.

FIG. 4 shows one embodiment of a method for booting a target device in accordance with the present invention at 400. The target device may be, for example, one or more devices 108, 110, 112 depicted in FIG. 1 and described above. In the embodiment of FIG. 4, the method is described from the perspective of a boot server; equivalent steps from the perspective of a proxy server and the target device are also contemplated by the present invention. In one embodiment of the invention, the proxy server and the boot server may be the same server.

In some embodiments of the invention, the method of FIG. 4 may be accomplished automatically. For example, boot server 107 and its associated services may generate a target device definition automatically and/or may boot the target device automatically using information from the inventory database and/or the policy database. Alternatively, the method of FIG. 4 may be administered. For example, the target device definition being generated may be presented to an administrator for review in a step-by-step manner by an administrator as it is being created. Alternatively, a summary of the target device definition may be presented to the administrator for approval at an appropriate point during the process. In some embodiments of the invention, the target device definition may be approved by an administrator or user of network 102 before being implemented.

The methods of the present invention may be used with any target device that is able to receive an IP address and be directed to a boot server. For example, the embodiment of the method shown in FIG. 4 may begin when one or more target devices are directed to a boot server by the subroutine of FIG. 6. Alternatively, the methods of the present invention may be used when one or more target devices send a request for a target device-specific configuration file as described, for example, below at step 516. Alternatively, the method of FIG. 4 may be used to respond to any suitable request to determine a target device-specific boot definition, including a request from a boot server, a proxy server, a loading device or a target device as described above.

As seen at block 400, boot server 107 may look for an initial target device-specific configuration file. In one embodiment of the invention, this target device-specific configuration file is indicated by or included in the target device definition. This target device-specification configuration file may be, for example, an initial NBP. The presence of such a target device-specific configuration file may indicate that the target device has already been defined at block 404. If such a target device-specific configuration file is found, the method may proceed to block 430. At block 430, the target device-specific configuration file may be transferred to the target device. At block 432, the boot server may receive one or more requests for additional boot files. These boot files may also be indicated by or included in the target device definition found at 404. These boot files may be transferred to the target device as seen at 434. The loop between blocks 432 and 434 may continue until the target device is booted. In one embodiment of the invention, the target device may be considered booted, when it is in a state where it can perform useful work for the end-user.

If, however, a target device-specific configuration file is not found at block 400, it may be indicated at block 404 that the target device is not defined. This may be indicated for example, when the boot server receives a response from the target device indicating that the target device-specific configuration file was not found. This response may take the form of, for example, a TFTP error.

The method may then proceed to block 406 where the boot server may then receive a request from the target device for default instructions for the target device's architecture type. This may occur, for example, if the initial NBP on the target device infers that the target device is not defined. The request from the target device may take the form of a TFTP request for an architecture-unique scan configuration file for the architecture of the target device. "Architecture" may refer to the type of processor that is contained in a given target client. For example, IBM-compatible Personal Computers are based on the Intel and Intel-compatible processors (such as AMD processors), and these machines have what is called an "Intel architecture". Other architectures include Apple Mac PCs, Palm Pilots, IBM RS/6000, etc. These architectures (and the processors that define them) may be incompatible with regard to the instructions that operate them. Therefore, each type of target client architecture would have to be supplied with its own Initial NBP and other programs in order to correctly operate on a given target client. The architecture of the client is indicated in the DHCP/PXE packets and the PXE Boot Discover packets sent from the client to the DHCP/PXE Server and the Boot Server. As described further below, these servers may be configured to process each client architecture separately to assure that the correct programs are delivered to a given target device.

At block 408, the boot server may then transfer the architecture-unique scan configuration file to the target device. In one embodiment of the invention, the boot server may determine the appropriate architecture-unique file by referring to an inventory database which lists types of target devices and their corresponding architectures or architecture unique files.

At block 410, the boot server may then receive one or more additional requests from the target device for one or more additional files required to boot and scan the target device with the architecture determined at 408. These requests may take the form of, for example, TFTP requests.

At block 412, the boot server may respond to these one or more requests with appropriate files for booting and scanning the target device. These responses may take the form of, for example, TFTP transfers of appropriate files. The loop between blocks 410 and 412 may continue until all appropriate files have been transferred to bring the target device to a condition in which hardware and software scans may be run on the target device. In one embodiment of the invention, this condition is not fully "booted" as described above, i.e., the target device cannot yet perform useful end work for the user although it is able to be scanned. For example, in some embodiments of the invention, blocks 410 and 412 may serve to provide a rudimentary environment on the target device so that one or more hardware and/or software scan programs may be run. This may be accomplished by an initial NBP which transfers the rudimentary environment and scan program(s) to the target device before passing control over to the target device.

At block 414, the boot server or the server daemon may receive a boot report from the target device. In one embodiment of the invention, this report is received after the initial NBP on the target device transfers execution to scan code which scans the hardware and software installed on the target device. The boot report may comprise a report detailing the hardware and/or software scan results. The boot report may also be any suitable report to boot server 107 or server daemon that describes the hardware and software profile of the target device. The boot report may take the form of, for example, a UDP transfer of the scan results of the target device.

At block 416, the boot server or the server daemon may acknowledge receipt of the boot report generated at block 414. For example, the server daemon may perform a UDP transfer of acknowledgment of receipt of the target device's scan results.

At block 418, the boot server or the server daemon may apply any additional target device-specific configurations or policies to the target device. For example, network wide policy for a given type of target device may indicate that a given hardware or software component on that type of target device must be enabled or disabled (e.g., if a given target device is a laptop, Microsoft(™) Outlook(™) must be installed on the target device, or all target devices with CD-ROM drives will have sound disabled.) The boot server may determine these additional target device-specific configurations or policies by reference to a policy database. Some of these additional target device-specific configurations may also be determined by a DMI scan that provides a list of additional plug-in devices that may be configured for use with one or more target devices. These target device-specific configurations or policies may be the same or additional target device-specific configurations or policies as those determined for the target device based on the inventory database. In one embodiment of the invention, the target device-specific configurations from the policy database or DMI scan override those of the inventory database. In another embodiment the target device-specific configurations from the policy database supplement those of the inventory database.

At block 420, the target device definition may be stored, for example, in any suitable storage location as described above.

At block 422, it may be indicated that the target device definition is completed. This may indicate, for example, that the target device is now defined. In one embodiment of the invention, a UDP transfer of a request for the target device to reboot may occur. This transfer may serve as an indication that the target device definition is completed.

At block 424, a DHCP discover may request a release of the IP address originally assigned to the target device. If the target device has already been defined, the DHCP discover of block 424 may serve in a similar capacity as the DHCP discover of block 502 as described further below. At this time, the target device may reboot and PXE ROM code may operate on the target device during the steps described in FIG. 5.

Figure 5:
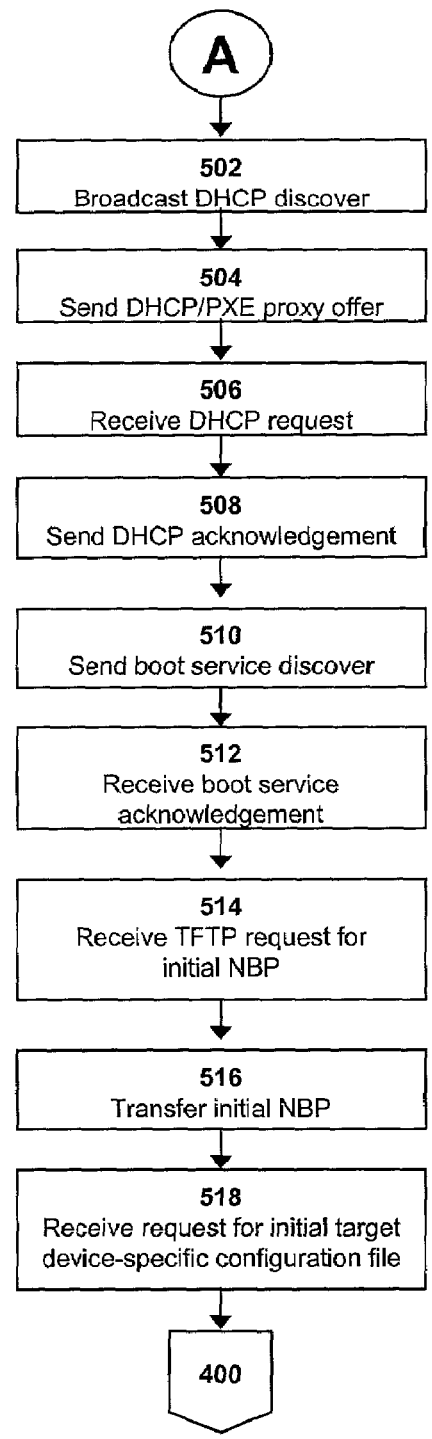
FIG. 5 is a subroutine of the flow diagram of the embodiment of a method of booting a target device in a network environment shown in FIG. 4.

FIG. 5 shows one embodiment of a subroutine A in a method for booting a target device in accordance with the present invention. In the embodiment shown in FIG. 5, the target device may be a device containing a network interface that is enabled to support PXE and in which PXE ROM code starts operating on the target device when the target device initially begins to boot. In the embodiment of FIG. 5, the method is described from the perspective of a proxy server attempting to boot the target device; equivalent steps from the perspective of a boot server and the target device are also contemplated by the present invention. In one embodiment of the invention, the proxy server attempting to boot the target device and the boot server may be the same server. The target device attempting to boot may be, for example, a target device that has been defined in accordance with the present invention.

At block 502, the server may broadcast a DHCP discover or other similar request to one or more target devices. This server may be, for example a DHCP/PXE Proxy Server as described above. In the embodiment of FIG. 5, the server contains a DHCP/PXE proxy service which is enabled to indicate a PXE Boot Service on boot server 107 as described above. The DHCP broadcast or DHCP discover may be a request for DHCP/PXE proxy offers. This discover broadcast may request an IP address from one or more target devices. The broadcast may also indicate whether or not a target device is PXE enabled. The broadcast may also indicate an architecture type for a given target device. The configuration of the DHCP/PXE Proxy server may be implemented on more than one machine as described above. The "standard" DHCP service (which offers IP addresses to clients) and the "proxy" DHCP service (which directs clients to a PXE Boot Server Discovery service) may be in separate locations. If the DHCP services are in separate locations, there may be two separate communications in accordance with the present invention: a "standard" DHCP offer which offers an IP address to the client, and a "proxy" DHCP offer which directs the client to a PXE Boot Server Discovery service. Moreover, any suitable configurations of the DHCP/PXE servers may be used in accordance with the present invention so long as the target device may receive an IP address and be directed to the boot server. For example, any of the configurations described in the Intel PXE Specification Version 2.1 may be used in accordance with the present invention.

Additionally, there may be more than one instance of a "standard" DHCP service, of a "proxy" DHCP service, and/or of a "combined" DHCP service (i.e. a DHCP service that does both by offering an IP address to the target device and directing the target device to a Boot Discovery service) within the range of the target device's DHCP Discover broadcast. This can be accomplished by placing the instances of these DHCP services on machines located in the same sub-network as the target device, and/or by configuring network gateways and routers to forward the client's DHCP Discover broadcasts to DHCP services on machines located in other sub-networks.

Having more than one instance of these DHCP services can provide redundancy in case any one instance of these DHCP services becomes unable to respond to a given target device. If the target device receives more than one "standard", "proxy" or "combined" DHCP/PXE Proxy offer, it will select only one IP address for its use, and will select only one Central Boot Server IP address to be directed to.

At block 504, one or more of servers 104, 105 may make a DHCP/PXE Proxy Offer. This offer may serve to offer an IP address to one or more target devices. This offer may also communicate that a PXE boot service is available at the IP address of boot server 107.

At block 506, the server may receive a DHCP request from one or more target devices. This DHCP request may indicate that a given target device has requested or accepted the IP address offered to it. Such an acceptance may permit the target device to conduct all further point-to-point network-wide communications.

At block 508, the server may acknowledge the request of block 506. By acknowledging the request at block 506, the server may thus be able to confirm that a given IP address has been assigned to a specific target device.

At block 510, the server may conduct a boot service discover. In one embodiment of the invention, the server may request the IP address of a TFTP service that will enable the server to request an initial NBP. The server may also request the name of the initial NBP file to be requested via the TFTP service. At this time, the server may also indicate the architecture type of one or more of the target devices. In one embodiment of the invention, this architecture type is determined as described above at block 502 and then conveyed during the boot service discover at block 510.

At block 512, the server may receive a boot service acknowledgment from boot server 107. This acknowledgment may indicate, for example, the IP address of boot server 107. This acknowledgment may also indicate the file name of the initial NBP for a given target device's architecture type.

As seen at block 514, the server may then receive a TFTP request from the target device. In one embodiment of the invention, the request is for an initial NBP file. The request may also be a request for a bootstrap, for example, a bootstrap associated with a particular OS.

As seen at block 516 a response may then be sent to the target device by the server or the boot server. For example, the server or boot server may conduct a TFTP transfer of the initial NBP to the target device as the response. In one embodiment of the invention, at this point, PXE ROM code may transfer execution from the server to the initial NBP which has now been transferred to the target device.

As seen at block 518, the target device, or the initial NBP on the target device may now send a TFTP request for an initial target device-specific configuration file. This may be, for example a target device-specific boot definition. From block 518, the subroutine described herein may proceed to the method described in FIG. 4 above.

Alternatively, if the target device has already been defined, the subroutine of FIG. 5 may return to block 400, where boot server 107 may look for an initial target device-specific configuration file. If the target device has been defined, for example, by creating a client definition with the method of FIG. 4, this target device-specific configuration file is indicated by or included in the target device definition and the method may proceed to block 430. At block 430, the target device-specific configuration file may be transferred to the target device. At block 432, the boot server may receive one or more requests for additional boot files. These boot files may also be indicated by or included in the target device definition found at 404. These boot files may be transferred to the target device as seen at 434. The loop between blocks 432 and 434 may continue until the target device is booted. In one embodiment of the invention, the target device may be considered booted, when it is in a state where it can perform useful work for the end-user.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal-bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms such as, for example, radio frequency and light wave transmissions. The computer readable media may take the form of coded formats that are decoded for actual use in a particular data processing system.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

What is claimed is:

1. A method of booting a plurality of target devices, comprising:

receiving, at a server in communication with the plurality of target devices, a request for a boot file from at least one target device;

determining at the boot server if the target device is defined;

creating, a definition for the target device wherein the definition is based on an architecture configuration of the target device;

receiving a request for an architecture-based configuration file from the target device;

receiving a request for an additional architecture-based configuration file from the target device; and executing a bootstrap at the target device, the bootstrap corresponding to the definition.

2. The method of claim 1, further comprising:
scanning the target device for at least one hardware configuration; and
creating the definition based on the hardware configuration.

3. The method of claim 1, further comprising:
scanning the target device for at least one software configuration; and
creating the definition based on the software configuration.

4. The method of claim 1, further comprising:
determining the architecture configuration of the target device.

5. The method of claim 1, further comprising:
determining at least one network policy for the target device; and
creating the definition based on the network policy.

6. The method of claim 1, further comprising:
receiving at least one request for a configuration file from the target device.

7. The method of claim 6, further comprising:
transferring the configuration file to the target device.

8. The method of claim 1, further comprising:
storing the definition.

9. A method of booting a target device in communication with a network based on a target device definition, comprising:
determining, if the target device has a target device configuration file;
if the device does not have the target device configuration file, transferring a first architecture-based configuration file to the target device;
receiving, a boot report from the target device;
receiving at least one request for additional architecture-based configuration file to the target device;
transferring least one network policy-based configuration file to the target device; and
creating the target device definition based on the first architecture-based configuration file, the boot report and the network policy-based configuration file.

10. The method of claim 9, further comprising:
creating the boot report based on a hardware scan of the target device.

11. The method of claim 9, further comprising:
creating the boot report based on a software scan of the target device.

12. The method of claim 9, further comprising:
acknowledging receipt of the boot report at the boot server.

13. The method of claim 9, further comprising:
transferring the additional architecture-based configuration file to the target device.

14. The method of claim 9, further comprising:
storing the target device definition.

15. The method of claim 9, further comprising:
re-booting the target device based on the target device definition.

16. Computer program product in a computer usable medium for boating a plurality of target devices in communication with a network based on a target device definition, comprising:
means for determining if the target device has a target device configuration file;
if the device does not have the associated target-device specific configuration file, means for transferring a first architecture-based configuration file to the target device;
means for receiving, at the boot server, a boot report from the target device;
means for receiving at least one request for an additional architecture-based configuration file from the target device;
means for transferring at least one network policy-based configuration file to the target device; and
means for creating the target device definition based on the architecture-based configuration file, the boot report and the network policy-based configuration file.

17. The program of claim 16, further comprising:
means for creating the boot report based on a hardware scan of the target device.

18. The program of claim 16, further comprising:
means for creating the boot report based on a software scan of the target device.

19. The program of claim 16, further comprising:
means for acknowledging receipt of the boot report at the boot server.

20. The program of claim 16, further comprising:
means for transferring the additional architecture-based configuration file to the target device.

21. The program of claim 16, further comprising:
means for storing the target device definition.

22. The program of claim 16, further comprising:
means for re-booting the target device based on the target device definition.

23. A system for booting a plurality of target devices based on a target device definition, comprising:
means for determining, if the target device has a target-device configuration file;
if the device does not have the target-device configuration file, means for transferring a first architecture-based configuration file to the target device;
means for receiving a boot report from the target device;
means for receiving at least one request for an additional architecture-based configuration file from the target device;
means for transferring at least one network policy-based configuration file to the target device; and
means for creating the target device definition based on the first architecture-based configuration file, the boot report and the network policy-based configuration file.

24. The system of claim 23, further comprising:
means for creating the boot report based on a hardware scan of the target device.

25. The system of claim 23, further comprising:
means for creating the boot report based on a software scan of the target device.

26. The system of claim 23, further comprising:
means for acknowledging receipt of the boot report at the boot server.

27. The system of claim 23, further comprising:
means for transferring the additional architecture-based configuration file to the target device.

28. The system of claim 23, further comprising:
means for storing the target device definition.

29. The system of claim 23, further comprising:
means for re-booting the target device based on the target device definition.

30. A boot server for booting a plurality of target devices based on at least one target device definition, comprising:
means for determining if a target device has a target-device configuration file;
means for transferring a first architecture-based configuration file to the target device;
means for receiving a boot report from the target device;
means for receiving at least one request for an additional architecture-based configuration file from the target device;
means for acknowledging receipt of the boot report at the boot server;
means for transferring at least one network policy-based configuration file to the target device; and
means for creating the target device definition based on the first architecture-based configuration file, the boot report and the network policy-based configuration file.

31. The boot server of claim 30, further comprising:
means for re-booting the target device based on the target device definition.

32. The boot server of claim 30, further comprising:
means for determining an architecture of the target device; and
means for creating the first architecture-based configuration file based on the determined architecture of the target device.

33. The boot server of claim 30, further comprising:
means for determining at least one network policy for the target device; and
means for creating the network-policy based configuration file based on the determined network policy.

* * * * *